United States Patent
Thoreson

(10) Patent No.: US 10,589,626 B2
(45) Date of Patent: Mar. 17, 2020

(54) IMPLEMENT POSITIONING GUIDANCE SYSTEM

(71) Applicant: Caterpillar Inc., Peoria, IL (US)

(72) Inventor: Joseph Allen Thoreson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 394 days.

(21) Appl. No.: 15/187,144

(22) Filed: Jun. 20, 2016

(65) Prior Publication Data

US 2017/0361708 A1 Dec. 21, 2017

(51) Int. Cl.
*B60K 35/00* (2006.01)
*E02F 9/20* (2006.01)
*E02F 9/26* (2006.01)
*G09G 5/00* (2006.01)

(52) U.S. Cl.
CPC .............. *B60K 35/00* (2013.01); *E02F 9/205* (2013.01); *E02F 9/2037* (2013.01); *E02F 9/2045* (2013.01); *E02F 9/265* (2013.01); *G09G 5/00* (2013.01); *B60K 2370/166* (2019.05); *B60K 2370/188* (2019.05); *B60K 2370/332* (2019.05); *B60K 2370/52* (2019.05); *G09G 2340/14* (2013.01)

(58) Field of Classification Search
CPC .............. B60K 35/00; B60K 2350/352; B60K 2370/166; B60K 2370/188; B60K 2370/332; B60K 2370/52; E02F 9/26–268; E02F 9/2025–2045; E02F 5/14; E02F 5/145; G06F 3/0412; G06F 3/04817; G06F 3/0484; G06F 3/14; E01C 19/004; E01C 19/006; E21C 35/08; E21C 35/24; E21D 9/003; E21D 9/004; E21D 23/00; G01S 7/10; G01C 21/3632; G01C 21/365; A63F 13/53–5378; A63F 13/837; F41G 3/00–326; G09G 2340/14; G09G 5/00
USPC .......................................... 175/45
See application file for complete search history.

(56) References Cited

U.S. PATENT DOCUMENTS

| | | | | |
|---|---|---|---|---|
| 2,049,496 | A | * | 8/1936 | Gaty ........................ F41G 1/08 89/41.22 |
| 3,778,169 | A | * | 12/1973 | Adams ................ G01C 15/002 33/293 |
| 6,535,282 | B2 | | 3/2003 | Hedges et al. |
| 8,340,873 | B2 | | 12/2012 | Finley et al. |

(Continued)

FOREIGN PATENT DOCUMENTS

WO 2016016978 A1 2/2016

*Primary Examiner* — David S Posigian
(74) *Attorney, Agent, or Firm* — Miller, Matthias & Hull

(57) ABSTRACT

A system and method for guiding an implement on a machine to a target location is disclosed. The system comprises a GUI and a controller in operable communication with the GUI. The controller is configured to: (a) determine a current location of the implement relative to the target location on the work surface; and (b) display on the GUI a symbol in one of a plurality of states, each state associated with one or more locations of the implement relative to the target location. The state in which the symbol is displayed is indicative of the current location of the implement relative to the target location and each state is identified by at least one illuminated portion of the symbol. The controller is further configured to: (c) repeat (a) and (b) each time the implement is moved to a new current location.

17 Claims, 16 Drawing Sheets

(56) References Cited

U.S. PATENT DOCUMENTS

| | | |
|---|---|---|
| 9,292,813 B2 | 3/2016 | Tucker et al. |
| 2006/0265914 A1 | 11/2006 | Gudat |
| 2007/0270685 A1* | 11/2007 | Kang ................. A61B 17/1764 600/424 |
| 2009/0225299 A1* | 9/2009 | Crawford ................. G01C 3/08 356/4.07 |
| 2010/0250189 A1* | 9/2010 | Brown ....................... F41G 3/06 702/181 |
| 2012/0290178 A1* | 11/2012 | Suzuki ................. E02F 9/2045 701/50 |
| 2013/0175092 A1 | 7/2013 | Kolpack et al. |
| 2014/0005931 A1* | 1/2014 | Ono ........................ G01C 21/00 701/445 |
| 2014/0036064 A1* | 2/2014 | Lu .......................... B60Q 9/005 348/118 |
| 2014/0271074 A1 | 9/2014 | Ogawa |
| 2015/0029017 A1* | 1/2015 | Thoreson ................ B60K 35/00 340/461 |
| 2015/0345114 A1 | 12/2015 | Nomura et al. |
| 2015/0362922 A1* | 12/2015 | Dollinger ............. A01B 69/008 701/2 |
| 2016/0053447 A1 | 2/2016 | Fritz et al. |
| 2016/0163109 A1* | 6/2016 | Kobayashi .............. G06F 3/011 345/633 |

* cited by examiner

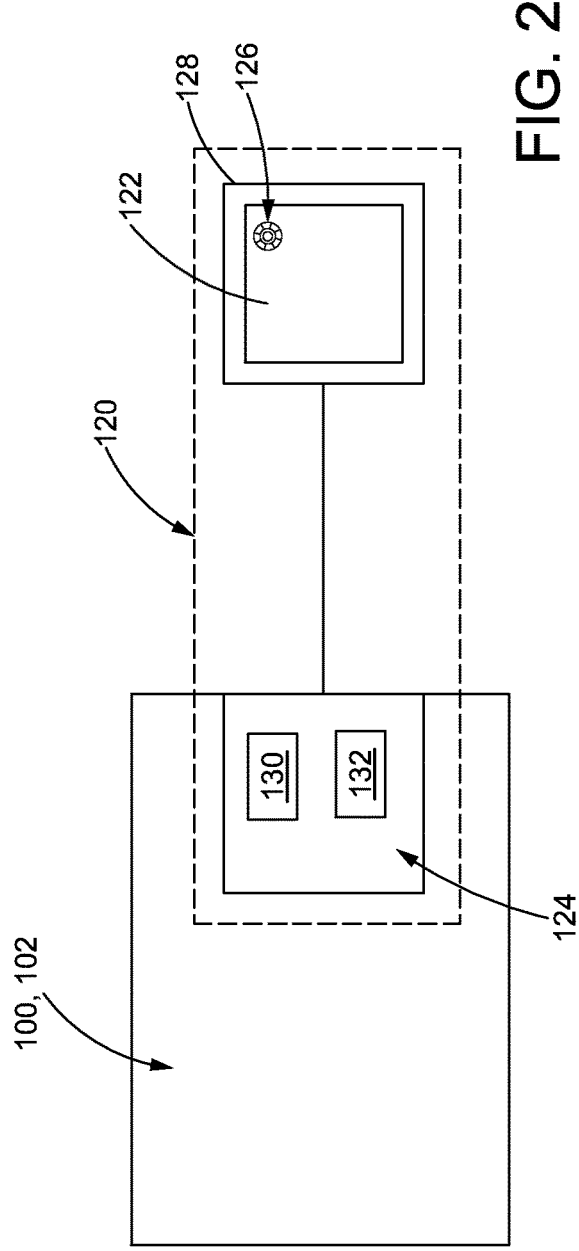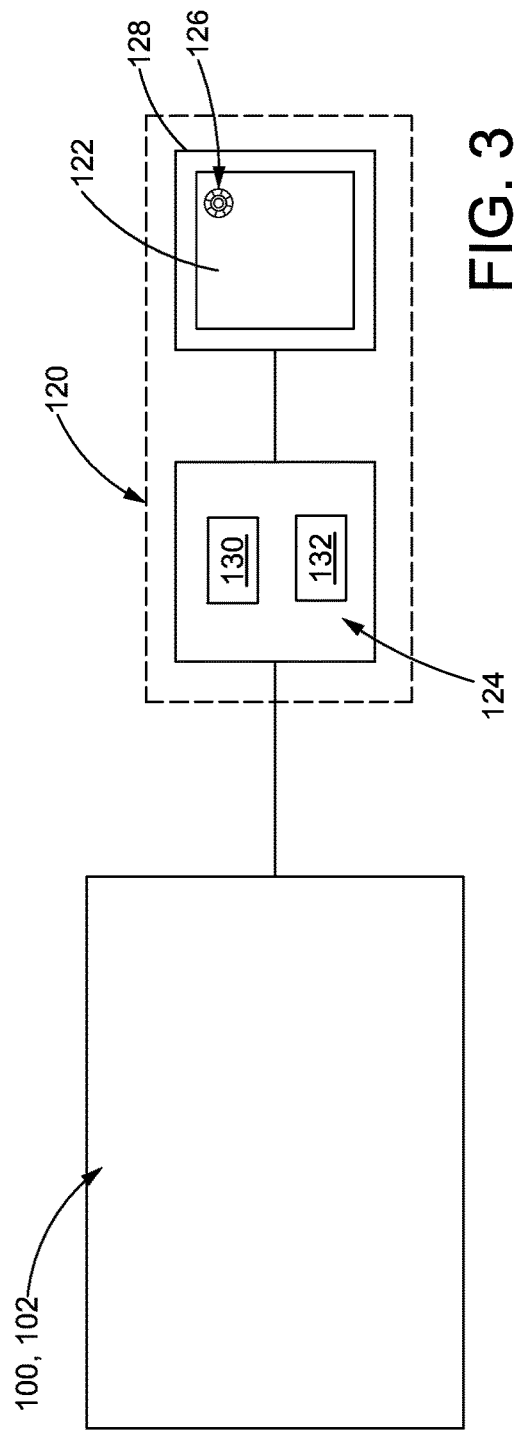

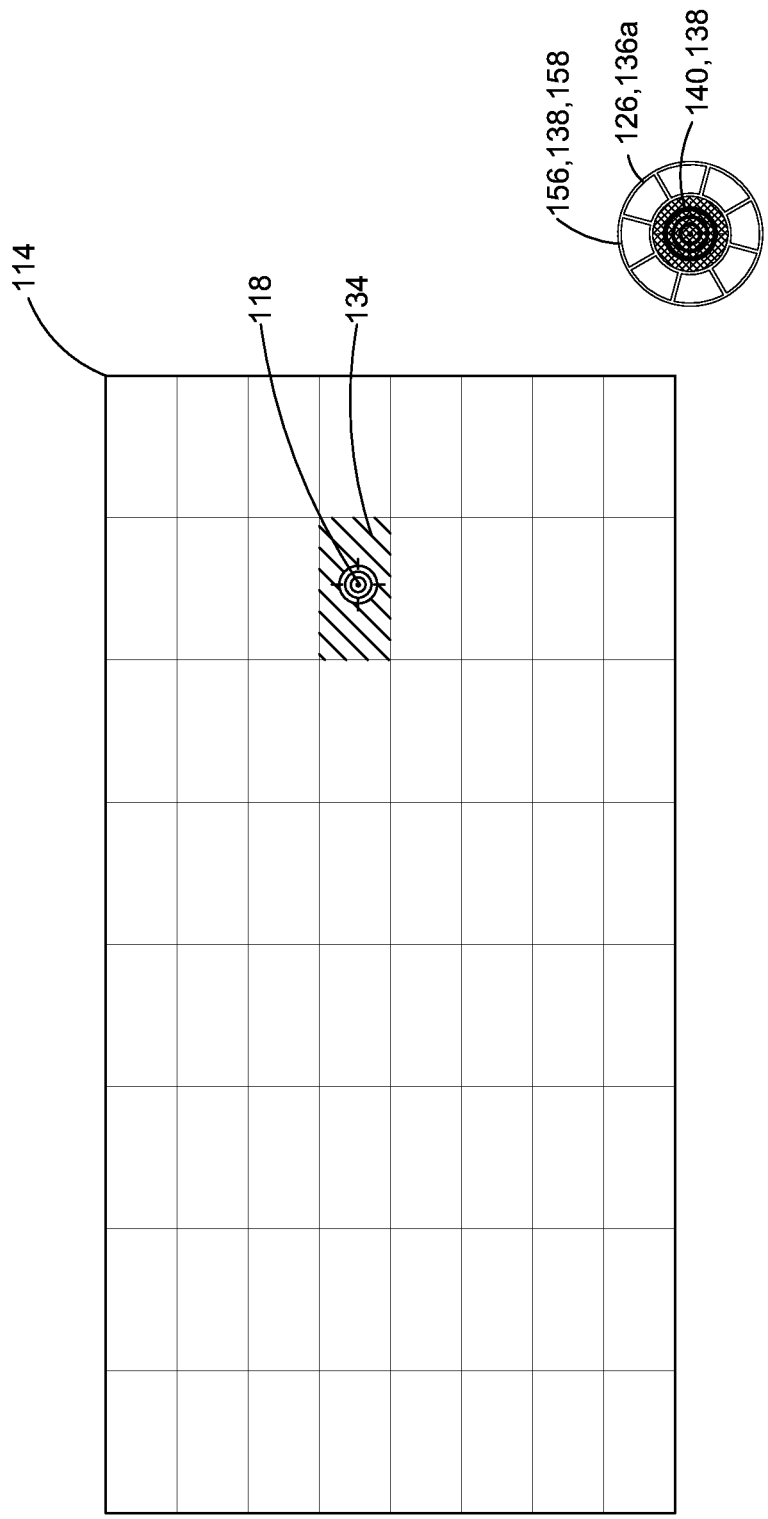

IMPLEMENT POSITIONING GUIDANCE SYSTEM

TECHNICAL FIELD

The present disclosure generally relates to implement positioning in machines and, more particularly, relates to implement positioning in machines for use in mining applications or other applications where operator line of sight to the implement may be partially or completely obscured.

BACKGROUND

Machines used in mining applications often work cutting rock away from rock walls inside underground tunnels. In some applications, the front of the machine, where the cutting tool is operating, may be hard for the operator to see. This may be because the work area is confined, dimly lit or there is a safety need to maintain a distance from the machine during operation, for example to avoid injury from falling/flying rock. Positioning the cutting tool, or other implement, can be difficult under these conditions. Further, when cutting rock walls, it is often beneficial to cut the wall away in a pattern to control the removal of the rock and the stability of the work surface. To do so, the implement must be placed in a certain position to cut the appropriate pattern. This type of precision only increases the difficulty of operator placement of the tool, especially when the tool is partially or entirely obscured by the machine, or the work conditions (confined area, dimly lit, etc.).

U.S. Patent Publication No. 2016/0053447 ("Fritz et al.") published Feb. 25, 2016, describes a location indicator system that includes a memory configured to store information identifying a location of one or more areas to be avoided in an external reference system (x, y, z) and a controller configured to compare a milling drum location to the areas to be avoided. A better system is needed.

SUMMARY OF THE DISCLOSURE

In accordance with one aspect of the disclosure, a system for guiding an implement on a machine to a target location on a work surface is disclosed. The system comprises a graphical user interface (GUI) and a controller in operable communication with the GUI. The controller is configured to: (a) determine a current location of the implement relative to the target location on the work surface; and (b) display on the GUI a symbol in one of a plurality of states, each state associated with one or more locations of the implement relative to the target location. The state in which the symbol is displayed is indicative of the current location of the implement relative to the target location and each state is identified by at least one illuminated portion of the symbol. The controller is further configured to repeat (a) and (b) each time the implement is moved to a new current location.

In accordance with another aspect of the disclosure, a method of guiding an implement on a machine to a target location on a work surface is disclosed. The method may comprise determining, by a controller, a current location of the implement relative to the target location; displaying on a graphical user interface (GUI) a symbol in one of a plurality of states, each state associated with one or more locations of the implement relative to the target location; and repeating the determining and the displaying each time the implement is moved to a new current location. The state in which the symbol is displayed is indicative of the current location of the implement relative to the target location and each state is identified by at least one illuminated portion of the symbol.

In accordance with a further aspect of the disclosure, a system for guiding an implement on a machine to a target location on a work surface is disclosed. The system comprises a graphical user interface (GUI) disposed remotely from the machine and a controller in operable communication with the GUI. The controller is configured to: (a) determine a current location of the implement relative to the target location on the work surface; and (b) display on the GUI a symbol in one of a plurality of states, each state associated with one or more locations of the implement relative to the target location. The state in which the symbol is displayed is indicative of the current location of the implement relative to the target location and each state is identified by at least one illuminated portion of the symbol. The controller is further configured to repeat (a) and (b) each time the implement is moved to a new current location. The symbol may be annular in shape and includes a plurality of sections arranged in a ring around a center area associated with the target location. Each section may have a perimeter, wherein in each state, the perimeters of each section in the plurality of sections are illuminated.

BRIEF DESCRIPTION OF THE DRAWINGS

FIG. 2 is a schematic representation of an embodiment of a control system for guiding the implement on an exemplary machine such as the one illustrated in FIG. 1;

FIG. 3 is a schematic representation of an alternative embodiment of the control system for guiding the implement on an exemplary machine such as the one illustrated in FIG. 1;

FIG. 17 is a schematic representation of an exemplary current location and an exemplary resulting symbol.

DETAILED DESCRIPTION

Figure 1:
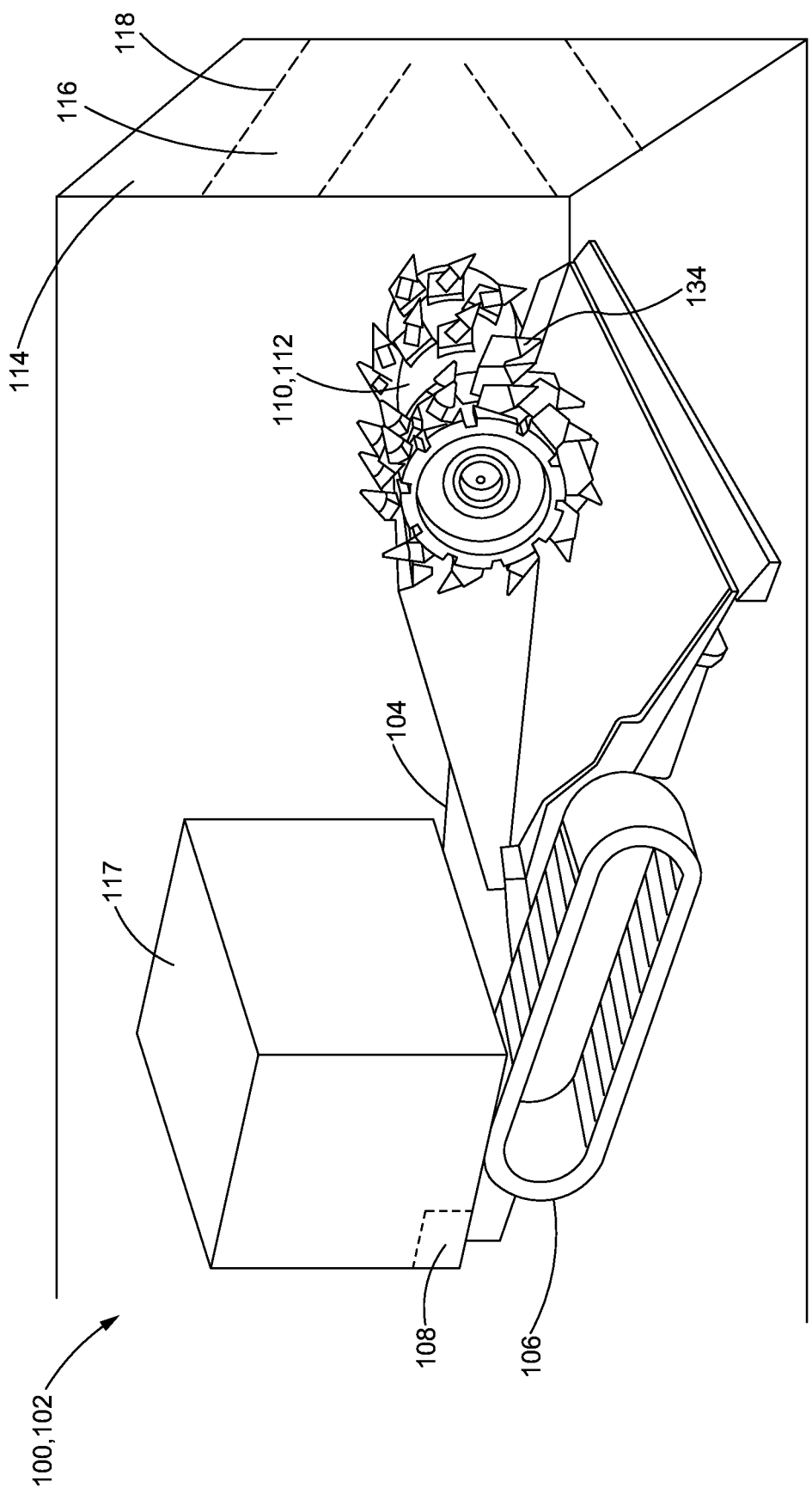
FIG. 1 is a perspective view of one exemplary machine having an implement.

FIG. 1 illustrates one example of a machine 100 that with which the system 120 (see FIGS. 2-3) of the present disclosure may be used. The exemplary machine 100 is a machine or vehicle such as an underground machine 102 (e.g., underground mining machine), or the like. The underground machine 102 may include a body 104 supported on the ground by a plurality of track assemblies, wheels, or the like (each, a "ground engaging unit 106"). One of ordinary skill in the art will appreciate that an engine 108 may provide power to the ground engaging units 106 and a final drive assembly (not shown) via mechanical or electric drive drain. The underground machine 102 may include an implement 110 operatively connected to the body 104. The implement 110 is used to perform an operation on a work surface 114. For example, the implement 110 may be a cutting tool 112 that cuts into the work surface 114 such as a rock wall. The work surface 114 may be cut by the implement 110 in a desired pattern 116. To effectuate the pattern 116, the cutting tool 112 is placed by the operator onto a target location 118 before cutting the work surface 114. In some embodiments, such as the exemplary underground machine 102 which typically operates underground in tunnels, the machine 100 may also include a roof bolter 117 that may be utilized to provide support to the roof of the underground tunnel. The roof bolter 117 and/or the cutting tool 112 may entirely or partially obscure from the operator the target location 118 on which the implement 110, in this embodiment the cutting tool 112, needs to be placed. While the following detailed description and drawings are made with reference to an exemplary underground machine 102, the teachings of this disclosure may be employed on other machines 100 having an implement 110, such as machines 100 used in mining, earth moving, construction, material handling and the like. For example, the teachings of this disclosure may be employed on machines 100 having an implement 110 in which a part of the machine 100 or the worksite obscures or partially obscures the target location 118 (for placement of the implement 110) from the operator of the machine 100. Typical scenarios when such may occur include when the operator is located remotely from the machine 100, is located behind the machine 100 and the machine blocks or partially blocks from view the target location 118, or is located in an operator cab disposed on top of the body 104 of the machine 100.

Referring now to FIG. 2, there is shown a system 120 for guiding the implement 110 on the machine 100 to the target location 118 on the work surface 114, in accordance with the present disclosure. The system 120 comprises a graphical user interface (GUI) 122 and a controller 124. The system 120, or some components of it, may be disposed remotely from the machine 100. In the embodiment of FIG. 2, the GUI 122 is disposed remotely from the machine 100 and the controller 124 is disposed on the machine 100. FIG. 3 illustrates an alternative arrangement, in which the GUI 122 and the controller 124 are both disposed remotely from the machine 100. As may be understood by one or ordinary skill in the art, in yet other scenarios, the GUI 122 may be disposed on the machine 100, and the controller 124 may be disposed on the machine 100 or remotely from the machine 100.

The GUI 122 may be any appropriate GUI 122, as is known in the art. For example, the GUI 122 may be a touch screen user interface configured to display a symbol 126, as discussed later herein. The GUI 122 may be part of a mobile device 128 (e.g., a hand-held device) or may, in some embodiments, be part of a remote operator station (not shown).

The controller 124 is in operative communication with the GUI 122. The controller 124 may include a processor 130 and a memory component 132. The processor 130 may be a microprocessor or other processor as known in the art.

The processor 130 may execute instructions and generate control signals for, among other things, processing received data indicative of a current location 134 of the implement 110, determining the current location 134 of the implement 110 relative to the target location 118 on the work surface 114, and displaying on the GUI 122 a symbol 126 that is associated with the current location 134 (relative to the target location 118). Such instructions that are capable of being executed by a computer may be read into or embodied on a computer readable medium, such as the memory component 132 or may be provided external to the processor 130. In alternative embodiments, hard wired circuitry may be used in place of, or in combination with, software instructions to implement a control method.

The term "computer readable medium" as used herein refers to any non-transitory medium or combination of media that participates in providing instructions to the processor 130 for execution. Such a medium may comprise all computer readable media except for a transitory, propagating signal. Common forms of computer-readable media include, for example, magnetic media, optical media, or any other medium from which a computer processor 130 can read.

The controller 124 is not limited to one processor 130 and memory component 132. The controller 124 may be several processors 130 and memory components 132. The controller 124 sends to and may receive signals from the GUI 122. The controller 124 may also be configured to retrieve information and data from the memory component 132 and to store information and data in the memory component 132. The controller 124 is configured to (a) determine the current location 134 of the implement 110 relative to the target location 118 on a work surface 114; (b) display on the GUI 122 the symbol 126 in one of a plurality of states 136; and (c) repeat (a) and (b) each time the implement 110 is moved to a new current location 134a.

In one embodiment, the controller 124 may be in operative communication with one or more sensors (not shown) on the machine 100. The sensors may be position sensors, angle sensors, or the like that capture data associated with (or measure) the current location 134 of the implement 110. The controller 124 may receive such data from such sensors and may determine the current location 134 of the implement 110 based, at least in part, on the received data. Alternatively, and/or alternatively the controller 124 may receive the current location 134 from another controller (not shown), or the like. Such other controller may be disposed on the machine 100 and may be in communication with sensors on the machine 100 that capture data associated with the current location 134 of the implement 110.

The target location 118 on the work surface 114 is the location where the implement 110 should be placed in contact with the work surface 114. More specifically, in an application that utilizes a underground machine 102, or the like, to cut a work surface 114 such as a rock wall, the target location 118 is the location (on the work surface 114) where the implement 110 should be placed (make contact with the rock wall) to start or continue to cut the desired pattern 116 in the work surface 114. The pattern 116 may be stored in the memory component 132 or received from a different controller (not shown) on the machine 100 (or remote from the machine 100). The target location 118 may be received by the controller 124 or may be determined by the controller 124 based on the pattern 116 or portion of the pattern 116 to be executed or currently being executed in the work surface 114.

Figure 4:
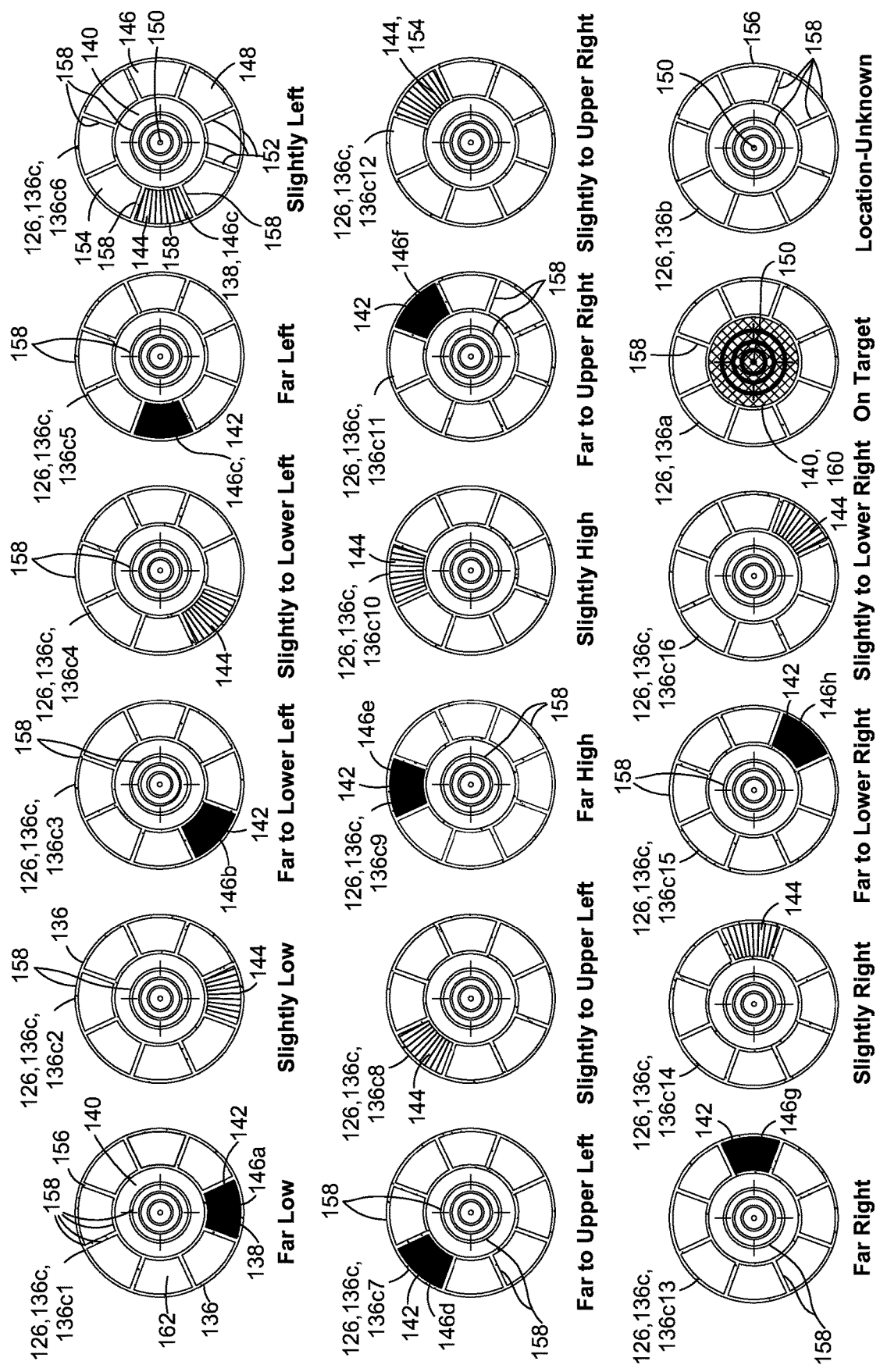
FIG. 4 is a schematic representation of a symbol shown in a plurality of states.

The controller 124 is further configured to display on the GUI 122 a symbol 126 in one of a plurality of states 136 (FIG. 4). The symbol 126 may be any appropriate graphic design, shape or icon. Each symbol 126 has a plurality of states 136. Each state 136 is associated with one or more locations of the implement 110 relative to the target location 118. For example, in the current embodiment, the symbol 126 has the following states 136: an on-target state 136a, a location-unknown state 136b and a plurality of directional states 136c. Each state 136 is different from other states 136.

The on-target state 136a occurs when the current location 134 (FIG. 1) of the implement 110 and the target location 118 are the same. In some embodiments, the on-target state 136a occurs when the current location 134 of the implement 110 and the target location 118 are substantially the same (within a threshold distance from the target location 118, such as within plus or minus 10 cm from the target location 118.)

The location-unknown state 136b (FIG. 4) occurs when either the controller 124 (FIGS. 2-3) cannot determine the current location 134 (FIG. 1) or the controller 124 does not receive data from which the current location 134 can be determined. The location-unknown state 136b may also occur when the controller 124 is configured to receive data regarding the current location 134 (as opposed to calculate or determine it) and such data, regarding current location 134, is not received.

Directional states 136c (FIG. 4) are those which indicate, for the current location 134, a relative direction from the target location 118 (for example, low, lower left, left, upper left, high, upper right, right, lower right). In some embodiments, the directional states 136c may also indicate a proximity to the target location 118 far (distal), slightly (near or proximal). Each directional state 136c is mapped or tied to one or more current locations 134 (may be tied to a range of locations). In some embodiments, the direction states 136c may include some or all of the following: far low 136c1, slightly low 136c2, far to lower left 136c3, slightly to lower left 136c4, far left 136c5, slightly left 136c6, far to upper left 136c7, slightly to upper left 136c8, far high 136c9, slightly high 136c10, far to upper right 136c11, slightly to upper right 136c12, far right 136c13, slightly right 136c14, far to lower right 136c15, and slightly to lower right 136c16.

The state 136 in which the symbol 126 is displayed is indicative of the current location 134 of the implement 110 relative to the target location 118. Each state 136 is identified by an illuminated portion 138 or combination of illuminated portions 138 of the symbol 126. When in the on-target state 136a or in the directional state 136c, the position of at least one of the illuminated portions 138 in relation to a center area 140 physically corresponds to a placement of the implement 110 relative to the target location 118. When in the directional state 136c, the color of the illumination of at least one portion of the symbol 126 indicates proximity to the target location 118 (for example, when far away, a first color 142 of illumination, such as red, may be used, and when slightly away from (near/proximal to) the target location 118, the same illuminated portion 138 of the symbol 126 may be illuminated in a second color 144, for example yellow). In some embodiments, other graphical information (e.g., visual cues) may be used, such as shading, visual patterns, etc.

FIG. 4 illustrates one exemplary embodiment of a symbol 126 (shown in various states 136). The symbol 126 (in the embodiment shown in FIG. 4) is annular in shape and includes a plurality of sections 146 arranged in a ring 148 around the center area 140. The center area 140 is associated with the target location 118. In the embodiment illustrated in FIG. 4, the center area 140 also includes a target icon 150. Each section 146 includes a perimeter 152 and a section area 154 inside the perimeter 152. In some embodiments, the section area 154 is bounded by the perimeter 152 of the section 146. In the exemplary embodiment shown, the symbol 126 does not include multiple rings. More specifically, the sections 146 of the symbol 126 are arranged in a single ring 162 with no other rings disposed between the center area 140 and the single ring 162, and no other rings (that are part of the symbol 126) disposed outside the outer circumference of the single ring 162. In other embodiments, the symbol 126 may include multiple rings. In some embodiments, the single ring 162 surrounding the center area 140 may less visually confusing for the operator (than multiple rings) and may increase the speed of operator recognition of implement position relative to the target location 118; thus, increasing the accuracy and efficiency of operator movement of the implement to the target location 118. However, other symbols 126 are within the scope of this disclosure and such other symbols 126 may be shaped differently than the symbol 126 illustrated in FIG. 4 and may have different illuminated portions 138 that are shaped differently than the exemplary embodiment of FIG. 4.

In this embodiment, in each state 136, the illuminated portion 138 of the symbol 126 may include the perimeters 152 of each section 146 in the plurality of sections 146 (in other words the "outline 156" of the symbol 126 is illuminated) as well as the target icon 150 disposed inside the center area 140. In some embodiments, the illumination of perimeters 152 of each section 146 may be a third color 158, for example white or a shade of white. In some embodiments, the illumination of the target icon 150 may also be the third color 158. The third color 158 may be different than the first color 142 or the second color 144. For the purposes of discussion herein, white light or shades of white light is considered to be a color, as is red, green, yellow and others that are conventionally considered to be colors. In some embodiments, other graphical information (e.g., visual cues) may be used, such as shading, visual patterns, etc.

As can be seen in FIG. 4, each directional state 136c may be identified by a position of at least one of the illuminated portions 138 within the symbol 126 and a color of that illuminated portion 138. In the embodiment illustrated in FIG. 4, the illuminated portions 138 of the directional state 136c are the outline 156 and one of the section areas 154. The position of the illuminated portion 138 that is the section area 154 in relation to the center area 140 physically corresponds to a placement of the implement 110 relative to the target location 118.

If the current location 134 and the target location 118 are the same, the state 136 is the on-target state 136a. As such, the center area 140 of the symbol 126, which is associated with the target location 118, is illuminated. In such a scenario, the center area 140 may be illuminated by a fourth color 160, for example green. In one embodiment of the on-target state 136a, the target icon 150 may be visible but not illuminated in on-target state 136a. The forth color may be different than the first, second or third colors. In some embodiments, other graphical information (e.g., visual cues) may be used, such as shading, visual patterns, etc.

If the current location 134 is determined to be unknown, the state 136 is the location-unknown state 136b. FIG. 4 illustrates an embodiment of the symbol 126 shown in the location-unknown state 136b; the illuminated portions 138 of the symbol 126 may include the target icon 150 and the perimeters 152 of each section 146. However, no section area 154 is illuminated inside the perimeters 152 of each section 146 in this embodiment of the location-unknown state 136b. In the embodiment, the illuminated portions 138 may be illuminated in the third color 158 (white).

As can be seen in the embodiment of FIG. 4, each directional state 136c is identified by the section area 154 illuminated and the color of the illumination. As shown in FIG. 4, the directional state 136c of "far low" 136c1 is identified by the illuminated portions 138 of: (1) the section area 154 of the "lowest section" 146a (for example, in the illustrated embodiment, the section area 154 disposed at the 6 o'clock position) illuminated in the exemplary first color 142 (red); and (2) the outline 156 illuminated in the exemplary third color 158 (white). This lowest section 146a extends lower than the other sections 145. In this embodiment, the first color 142 is different from the second color 144, third color 158 and fourth color 160. In an alternative embodiment, the directional state 136c of "far low" 136c1 could be identified by the illumination of the section area 154 of the lowest section 146a in the first color 142 (displayed without illumination of all or some of the outline 156 of the symbol 126).

As shown in FIG. 4, the directional state 136c of "slightly low" 136c2 is identified by the illuminated portions 138: (1) the section area 154 of the lowest section 146a illuminated in the exemplary second color 144 (yellow); and (2) the outline 156 illuminated in the exemplary third color 158 (white). Alternatively, the directional state 136c of "slightly low" 136c2 could be identified by the illumination of the section area 154 of the lowest section 146a in the second color 144 (displayed without illumination of all or some of the outline 156).

As shown in FIG. 4, the directional state 136c of "far to lower left" 136c3 is identified by the illuminated portions 138: (1) the section area 154 of the "left lower section" 146b (disposed left of the center area 140) illuminated in the exemplary first color 142 (red) (the left lower section 146b is disposed higher than the lowest section 146a but lower than the "left section" 146c); and (2) the outline 156 illuminated in the exemplary third color 158 (white). Alternatively, the directional state 136c of "far to lower left" 136c3 could be identified by the illumination of the section area 154 of the left lower section 146b in the first color 142 (displayed without illumination of all or some of the outline 156).

As shown in FIG. 4, the directional state 136c of "slightly to lower left" 136c4 is identified by the illuminated portions 138: (1) the section area 154 of the left lower section 146b illuminated in the exemplary second color 144 (yellow); and (2) the outline 156 illuminated in the exemplary third color 158 (white). Alternatively, the directional state 136c of "slightly to lower left" 136c4 could be identified by the illumination of the section area 154 of the left lower section 146b in the second color 144 (displayed without illumination of all or some of the outline 156).

As shown in FIG. 4, the directional state 136c of "far left" 136c5 is identified by the illuminated portions 138: (1) the section area 154 of a "left section" 146c (that is disposed left of the center area 140; for example, in the embodiment of the symbol 126, at the 9 o'clock position that is left of the center area 140 and above the left lower section 146b) illuminated in the exemplary first color 142 (red); and (2) the outline 156 illuminated in the exemplary third color 158 (white). Alternatively, the directional state 136c of "far left" 136c5 could be identified by the illumination of the section area 154 of the left section 146c in the first color 142 (displayed without illumination of all or some of the outline 156).

As shown in FIG. 4, the directional state 136c of "slightly left" 136c6 is identified by the illuminated portions 138: (1) the section area 154 of the left section 146c illuminated in the exemplary second color 144 (yellow); and (2) the outline 156 illuminated in the exemplary third color 158 (white). Alternatively, the directional state 136c of "slightly left" 136c6 could be identified by the illumination of the section area 154 of the left section 146c in the second color 144 (displayed without illumination of all or some of the outline 156).

As shown in FIG. 4, the directional state 136c of "far to upper left" 136c7 is identified by the illuminated portions 138 of: (1) the section area 154 of the "left higher section" 146d (that is disposed left of the center area 140 and above the left section 146c) illuminated in the exemplary first color 142 (red); and (2) the outline 156 illuminated in the exemplary third color 158 (white). Alternatively, the directional state 136c of "far to upper left" 136c7 could be identified by the illumination of the section area 154 of the left higher section 146d in the first color 142 (displayed without illumination of all or some of the outline 156).

As shown in FIG. 4, the directional state 136c of "slightly to upper left" 136c8 is identified by the illuminated portions 138 of: (1) the section area 154 of the left higher section 146d illuminated in the exemplary second color 144 (yellow); and (2) the outline 156 illuminated in the exemplary third color 158 (white). Alternatively, the directional state 136c of "slightly to upper left" 136c8 could be identified by the illumination of the section area 154 of the left higher section 146d in the second color 144 (displayed without illumination of all or some of the outline 156).

As shown in FIG. 4, the directional state 136c of "far high" 136c9 is identified by the illuminated portions 138 of: (1) the section area 154 of the highest section 146e (for example, 12 o'clock position) illuminated in the exemplary first color 142 (red); and (2) the outline 156 illuminated in the exemplary third color 158 (white). Alternatively, the directional state 136c of "far high" 136c9 could be identified by the illumination of the section area 154 of the highest section 146e in the first color 142 (displayed without illumination of all or some of the outline 156).

As shown in FIG. 4, the directional state 136c of "slightly high" 136c10 is identified by the illuminated portions 138 of: (1) the section area 154 of the highest section 146e illuminated in the exemplary second color 144 (yellow); and (2) the outline 156 illuminated in the exemplary third color 158 (white). Alternatively, the directional state 136c of "slightly high" 136c10 could be identified by the illumination of the section area 154 of the highest section 146e in the second color 144 (displayed without illumination of all or some of the outline 156).

As shown in FIG. 4, the directional state 136c of "far to upper right" 136c11 is identified by the illuminated portions 138 of: (1) the section area 154 of the "right high section" 146f (disposed to the right of the center area 140, below the highest section 146e and above the right section 146g) illuminated in the exemplary first color 142 (red); and (2) the outline 156 illuminated in the exemplary third color 158 (white). Alternatively, the directional state 136c of "far to upper right" 136c11 could be identified by the illumination of the section area 154 of the right high section 146f in the first color 142 (displayed without illumination of all or some of the outline 156).

As shown in FIG. 4, the directional state 136c of "slightly to upper right" 136c12 is identified by the illuminated portions 138 of: (1) the section area 154 of the right high section 146f illuminated in the exemplary second color 144 (yellow); and (2) the outline 156 illuminated in the exemplary third color 158 (white). Alternatively, the directional state 136c of "slightly to upper right" 136c12 could be identified by the the illumination of the section area 154 of the right high section 146f in the second color 144 (displayed without illumination of all or some of the outline 156).

As shown in FIG. 4, the directional state 136c of "far right" 136c13 is identified by the illuminated portions 138 of: (1) the section area 154 of the "right section" 146g (that is right of the center area 140; for example, in the embodiment of the FIG. 4, at the 3 o'clock position that is right of the center area 140 and higher than the right lower section 146h) illuminated in the exemplary first color 142 (red); and (2) the outline 156 illuminated in the exemplary third color 158 (white). Alternatively, the directional state 136c of "far right" 136c13 could be identified by the illumination of the section area 154 of the right section 146g in the first color 142 (displayed without illumination of all or some of the outline 156).

As shown in FIG. 4, the directional state 136c of "slightly right" 136c14 is identified by the illuminated portions 138 of: (1) the section area 154 of the right section 146g illuminated in the exemplary second color 144 (yellow); and (2) the outline 156 illuminated in the exemplary third color 158 (white). Alternatively, the directional state 136c of "slightly right" 136c14 could be identified by the illumination of the section area 154 of the right section 146g in the second color 144 (displayed without illumination of all or some of the outline 156).

As shown in FIG. 4, the directional state 136c of "far to lower right" 136c15 is identified by the illuminated portions 138 of: (1) the section area 154 of the "right lower section" 146h (disposed to the right of the center area 140) illuminated in the exemplary first color 142 (red) (the right lower section 146h is disposed higher than the lowest section 146a but lower than the right section 146g); and (2) the outline 156 illuminated in the exemplary third color 158 (white). Alternatively, the directional state 136c of "far to lower right" 136c15 could be identified by the illumination of the section area 154 of the right lower section 146h in the first color 142 (displayed without illumination of all or some of the outline 156).

As shown in FIG. 4, the directional state 136c of "slightly to lower right" 136c16 is identified by the illuminated portions 138 of: (1) the section area 154 of the right lower section 146h illuminated in the exemplary second color 144 (yellow); and (2) the outline 156 illuminated in the exemplary third color 158 (white). Alternatively, the directional state 136c of "slightly to lower right" 136c16 could be identified by the illumination of the section area 154 of the right lower section 146h in the second color 144 (displayed without illumination of all or some of the outline 156).

Also disclosed is a method 500 of guiding the implement 110 on the machine 100 to the target location 118 on the work surface 114. The method 500 may comprise: determining, by a controller 124, a current location 134 of the implement 110 relative to the target location 118; displaying, on a GUI 122, a symbol 126 in one of a plurality of states 136, each state 136 associated with one or more locations of the implement 110 relative to the target location 118, wherein the state 136 in which the symbol 126 is displayed is indicative of the current location 134 of the implement 110 relative to the target location 118, each state 136 identified by an illuminated portion 138 or combination of illuminated portions 138 of the symbol 126; and repeating the determining and the displaying each time the implement 110 is moved to a new current location 134a.

INDUSTRIAL APPLICABILITY

Figure 5:
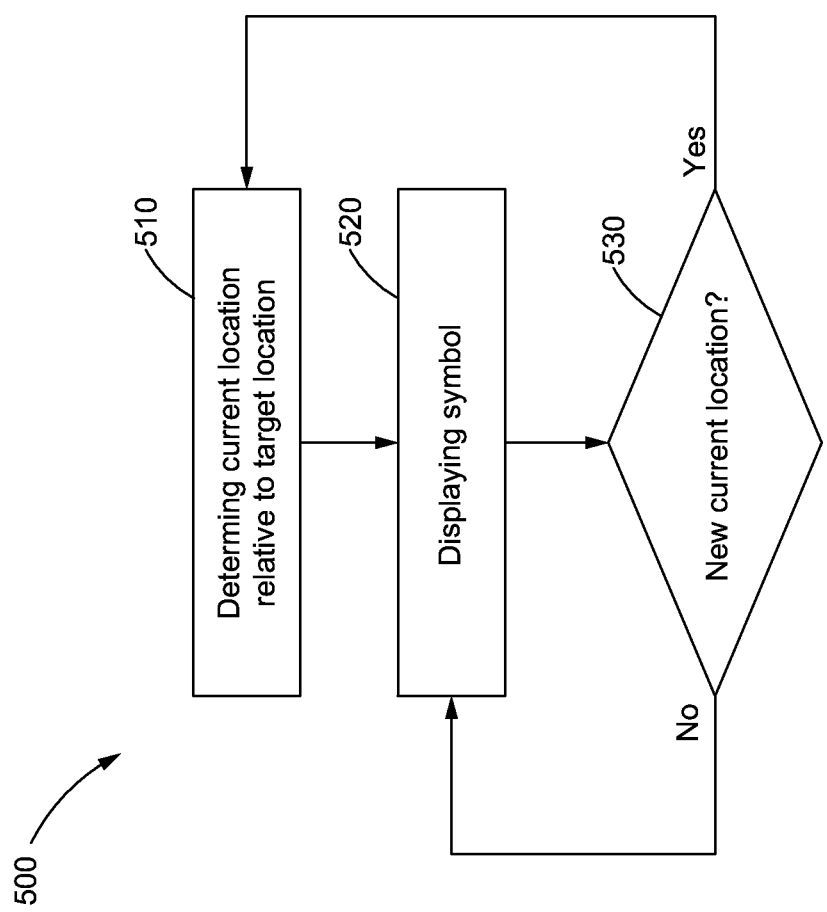
FIG. 5 is an exemplary method for guiding the implement on the exemplary machine of FIG. 1.

FIG. 5 illustrates an exemplary method 500 for of guiding the implement 110 on the machine 100 to the target location 118 on the work surface 114. FIGS. 6-12 are used to illustrate a first exemplary scenario in which the method 500 is used. FIGS. 13-17 are used to illustrate a second exemplary scenario in which the method 500 is used.

The controller 124, in block 510, determines a current location 134 of the implement 110 relative to the target location 118. The method 500 proceeds to block 520.

Figure 6:
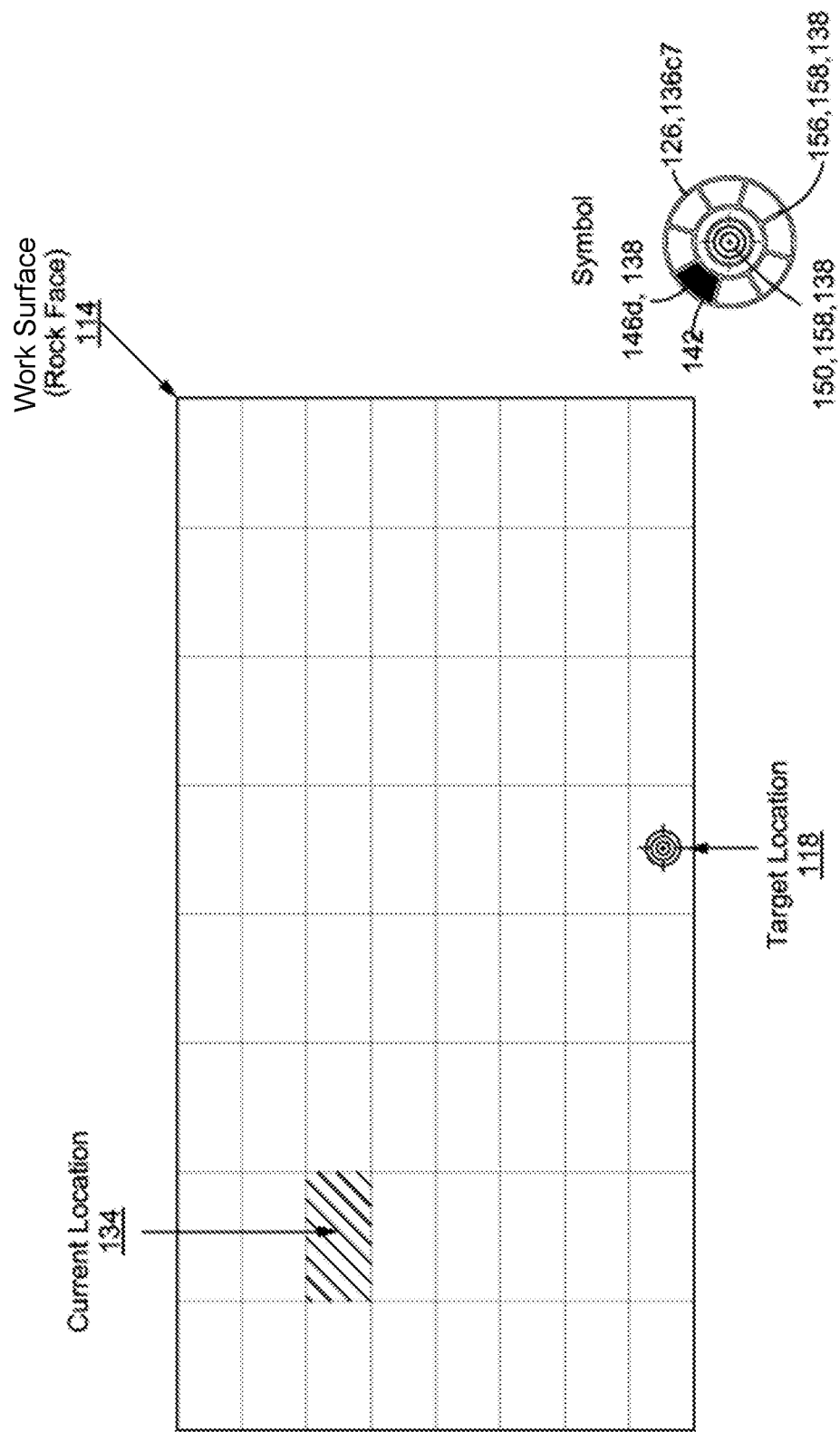
FIG. 6 is a schematic representation of an exemplary current location and an exemplary resulting symbol.

The method 500 further includes, in block 520, the controller 124 displaying on the GUI 122 a symbol 126 in one of the plurality of states 136. As discussed earlier herein, the symbol 126 is indicative of the current location 134 of the implement 110 relative to the target location 118. To facilitate understanding of the disclosure, FIG. 6 illustrates a grid showing an exemplary determination of the current location 134 on a work surface 114 (in this case a rock wall) relative to the target location 118 on the work surface 114. FIG. 6 also illustrates the symbol 126 (according to the exemplary embodiment described above) that would be displayed on the GUI 122 by the controller 124 as a result of the determination.

As can be seen, the current location 134 of the implement 110 is positioned to the upper left of the target location 118 and relatively far from the target location 118. Indicative of a relative direction of the current location 134 from the target location 118, the section area 154 of the left higher section 146d of the symbol 126 is illuminated. To indicate a proximity of the current location 134 relative to the target location 118 (e.g., the current location 134 is far from the target location 118, as opposed to slightly away) the section area 154 is illuminated in the first color 142 (red). The outline 156 and the target icon 150 are each illuminated in the third color 158 (white). The method 500 proceeds to block 530.

In block 530, the controller 124 determines if the implement 110 has moved to a new current location 134a. If yes, the new current location 134a becomes the current location 134 and the method 500 returns to block 510. In the embodiment of the exemplary method 500 illustrated in FIG. 5, the method 500 will return to block 510 when there is a new current location 134a that is different than the (previous) current location 134; this includes the situation in which the new current location 134a is underdetermined (e.g., the controller 124 cannot determine the new current location 134a or the controller 124 does not receive data from which the new current location 134a can be determined) and the (previous) current location 134 was determined. (If the new current location 134a is underdetermined, the resulting symbol 126 will be shown in the location-unknown state 136b.)

If the result of block 530 is "no," the method 500 returns to block 520, which results in the controller 124 continuing to display the symbol 126 in the same state 136 as previously displayed. The method 500 then proceeds to block 530.

Figure 7:
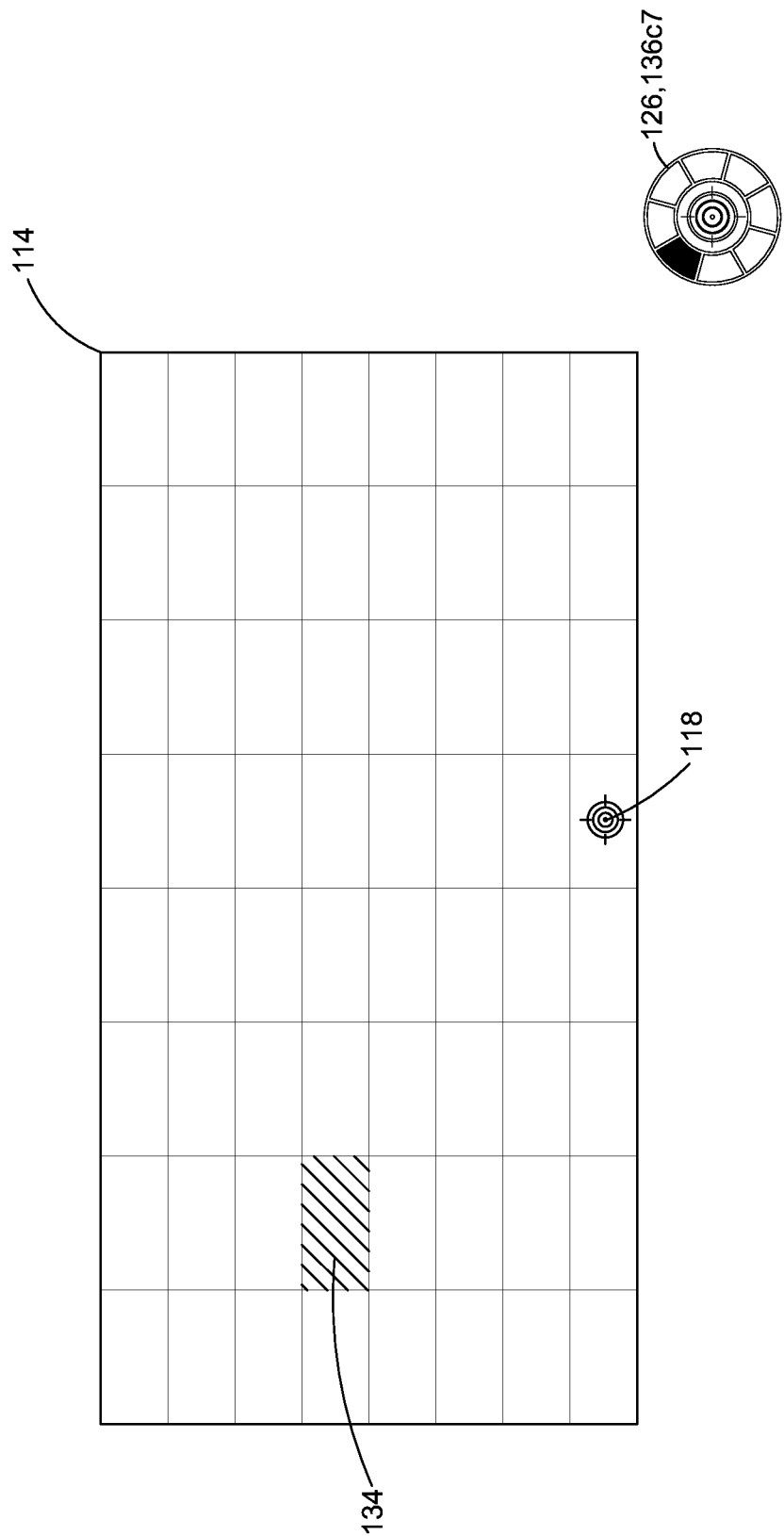
FIG. 7 is a schematic representation of an exemplary current location and an exemplary resulting symbol.

In the exemplary scenario illustrated by the sequence of FIGS. 6-12, the new current location 134a shown in FIG. 7 is different than the (previous) current location 134 of FIG. 6. As a result, the new current location 134a becomes the current location 134 and the process returns to block 510 in which the controller 124 determines the current location 134 of the implement 110 relative to the target location 118 and then proceeds to block 520.

For discussion purposes, the position of the new current location 134a relative to the target location 118 is shown in FIG. 7 as well as the (previous) current location 134 (of FIG. 6). FIG. 7 also illustrates the result of block 520. As can be seen, the new current location 134a is lower than the (previous) current location 134 but the symbol 126 is unchanged. The symbol 126 is unchanged because both the (previous) current location 134 and the new current location 134a are in a range covered by the state 136 in which the symbol 126 is shown, namely the directional state 136c of far to upper left 136c7 (of the target location 118). As discussed above, the method 500 will proceed to block 530 after block 520.

Figure 8:
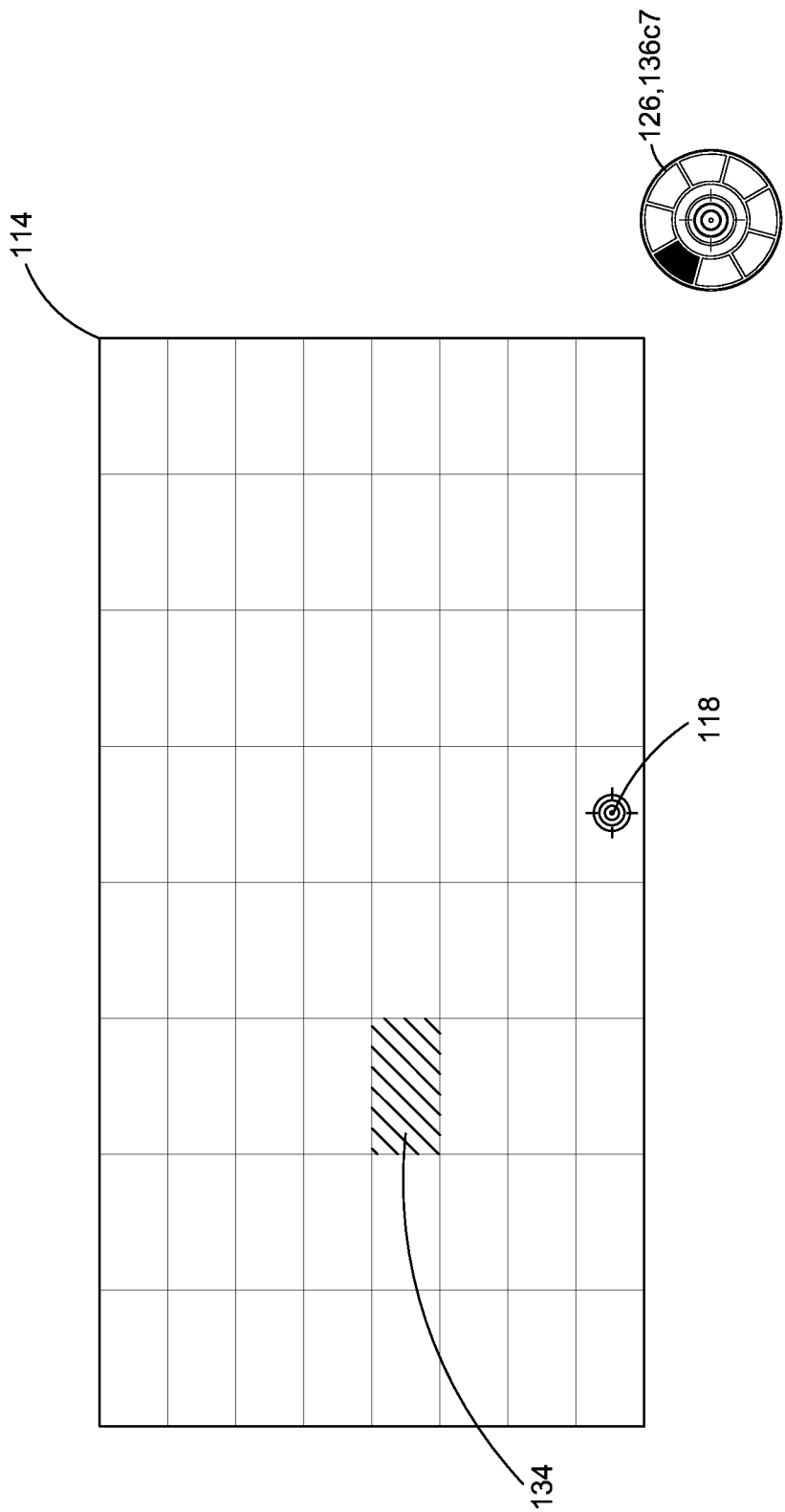
FIG. 8 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 will procced to block 510 and then to block 520. FIG. 8 illustrates the results of block 510 and block 520. As can be seen, the current location 134 of FIG. 8 is lower and is closer to the target location 118 but the symbol 126 is, again, unchanged because the current locations 134 of FIG. 6, FIG. 7 and FIG. 8 are each in the range covered by the state 136 in which the symbol 126 is shown. The method 500 will proceed to block 530.

Figure 9:
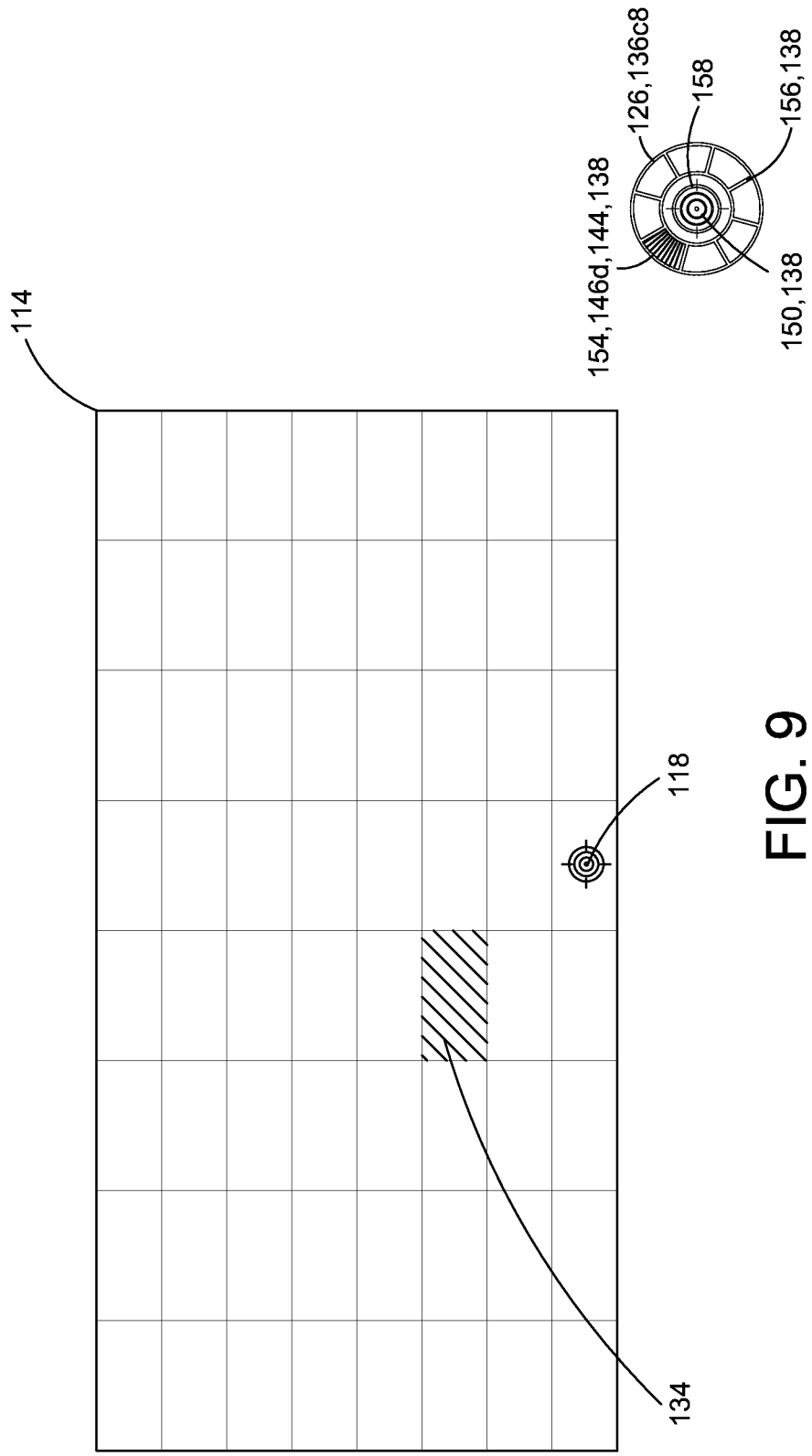
FIG. 9 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 will procced to block 510 and then 520. FIG. 9 illustrates the results of block 510 and block 520. As can be seen, the current location 134 is lower than that shown in FIG. 8 and is closer to the target location 118. The resulting symbol 126 is displayed in the directional state 136c of slightly to upper left 136c8, represented by the section area 154 of the left higher section 146d illuminated in the second color 144 (yellow). The outline 156 and the target icon 150 are each illuminated in the third color 158 (white). The method 500 proceeds to block 530.

Figure 10:
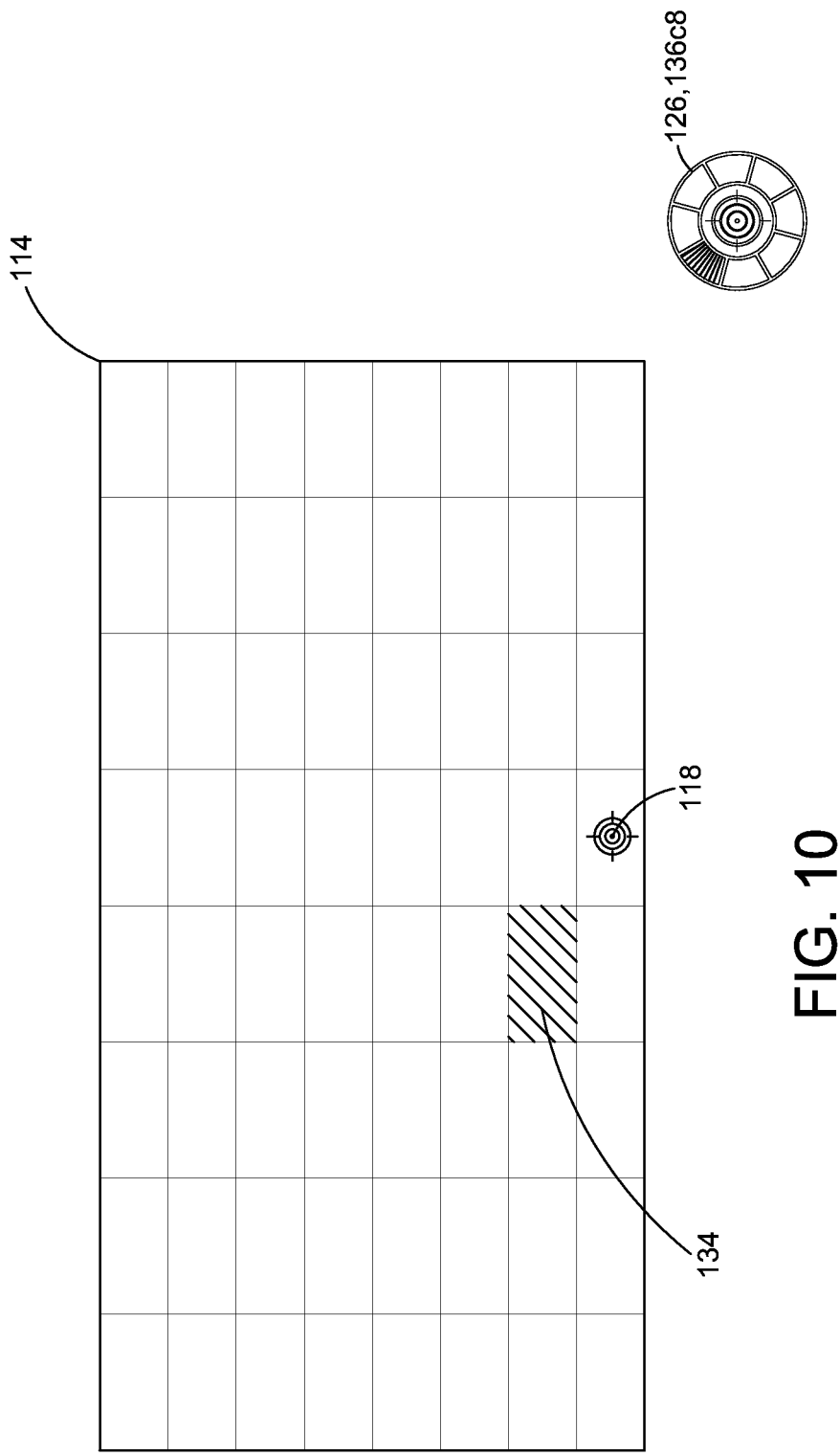
FIG. 10 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 will procced to block 510 and then to block 520. FIG. 10 illustrates the results of block 510 and block 520. As can be seen, the current location 134 is lower than that shown in FIG. 9 and is closer to the target location 118 but the symbol 126 is unchanged because the current locations 134 of FIG. 9 and FIG. 10 are each in the range covered by the state 136 in which the symbol 126 is shown. The method 500 proceeds to block 530.

Figure 11:
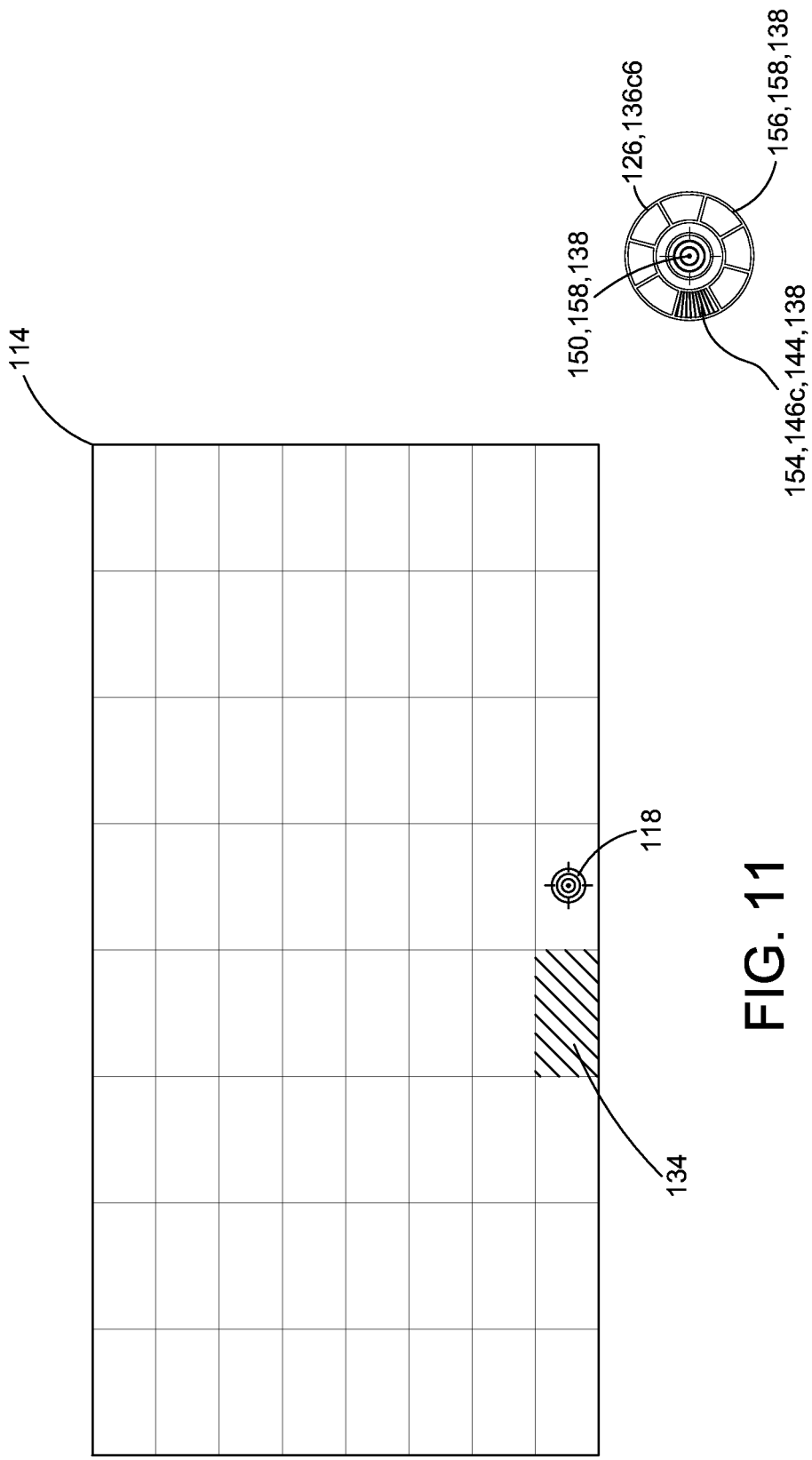
FIG. 11 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 will procced to block 510 and then to block 520. FIG. 11 illustrates the results of block 510 and block 520. As can be seen, the current location 134 is lower than that shown in FIG. 10. The resulting symbol 126 is displayed in the directional state 136c of slightly left 136c6 represented by the section area 154 of the left section 146c illuminated in the second color 144 (yellow). The outline 156 and the target icon 150 are each illuminated in the third color 158 (white). The process proceeds to block 530.

Figure 12:
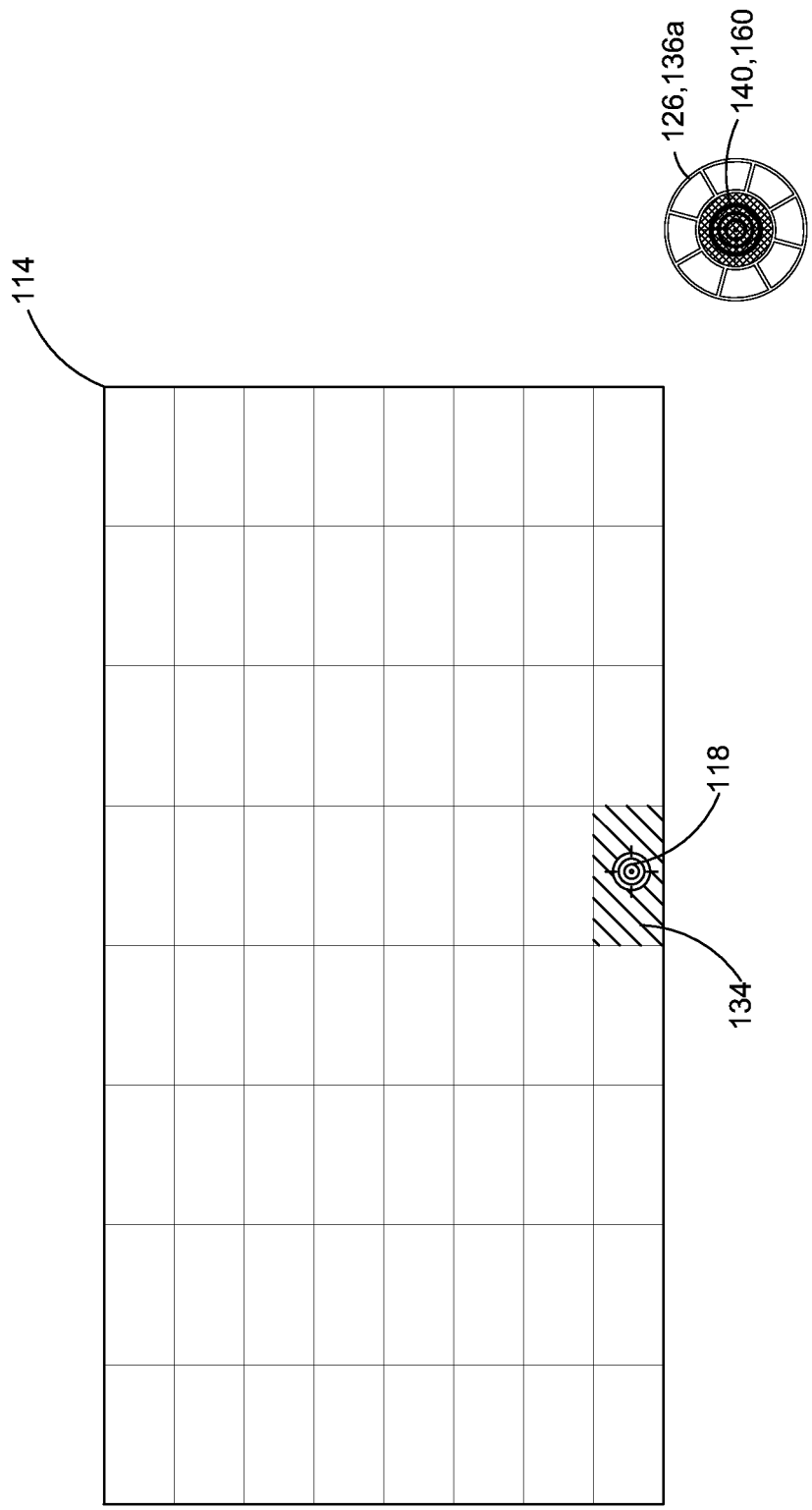
FIG. 12 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 proceeds to block 510 and then 520. FIG. 12 illustrates the results of block 510 and block 520. As can be seen, the current location 134 is now on the target location 118. The resulting symbol 126 is displayed in the on-target state 136a represented by the center area 140 illuminated in the fourth color 160 (green). The outline 156 is illuminated in the third color 158 (white). The implement 110, in this case a cutting tool 112, is now in the correct position to begin cutting the work surface 114.

Figure 13:
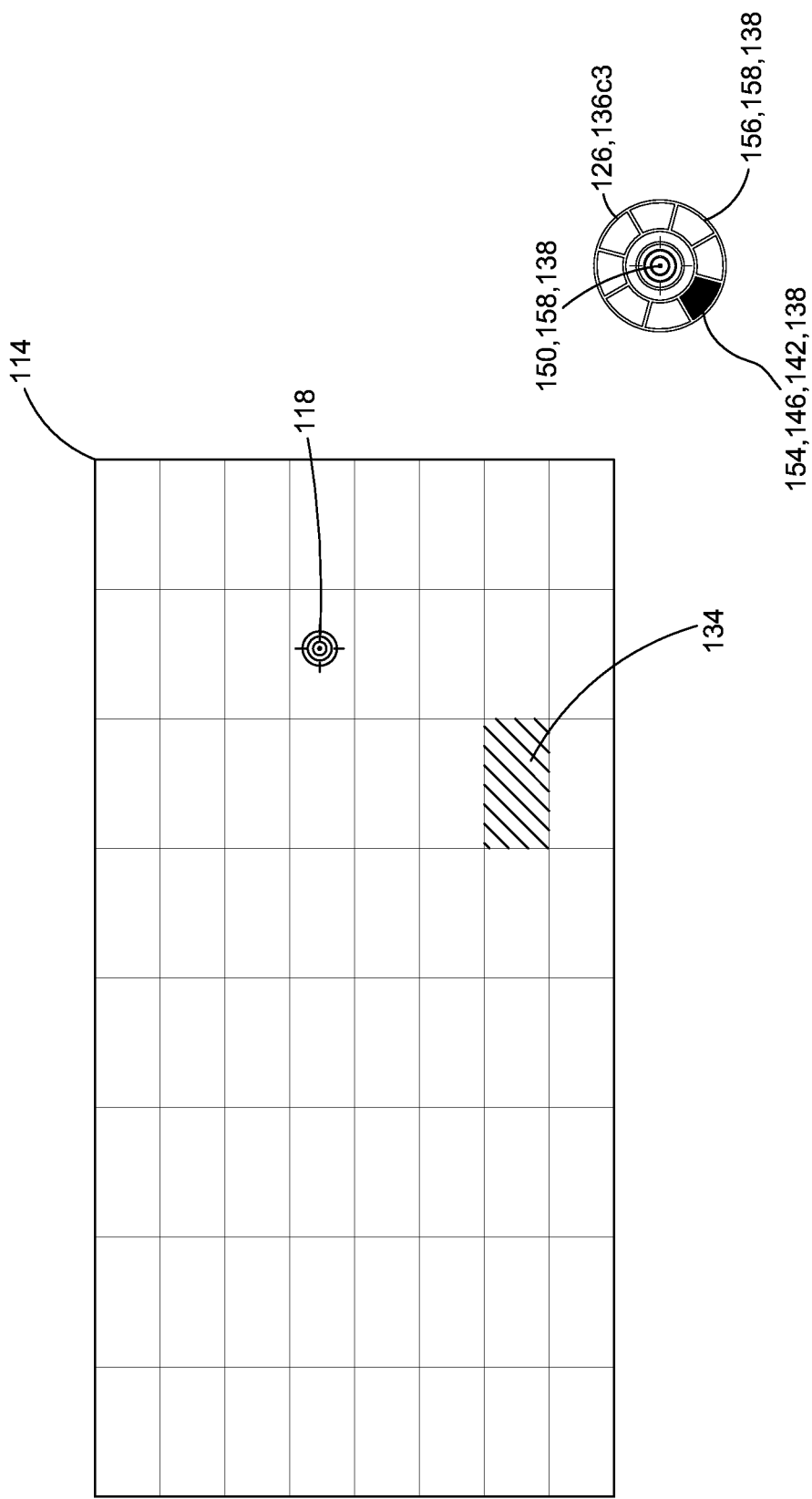
FIG. 13 is a schematic representation of an exemplary current location and an exemplary resulting symbol.

FIGS. 13-17 illustrate a second scenario using the method 500. In this second scenario, the controller 124, in block 510, determines a current location 134 of the implement 110 relative to the target location 118. The method 500 proceeds to block 520. FIG. 13 illustrates the results of block 510 and block 520. As can be seen, the current location 134 is disposed to the lower left of the target location 118. The resulting symbol 126 is shown in the directional state 136c of far to lower left 136c3 with the section area 154 of the left lower section 146b illuminated in the first color 142 (red). The outline 156 and the target icon 150 are each illuminated in the third color 158 (white). The method 500 proceeds to block 530.

Figure 14:
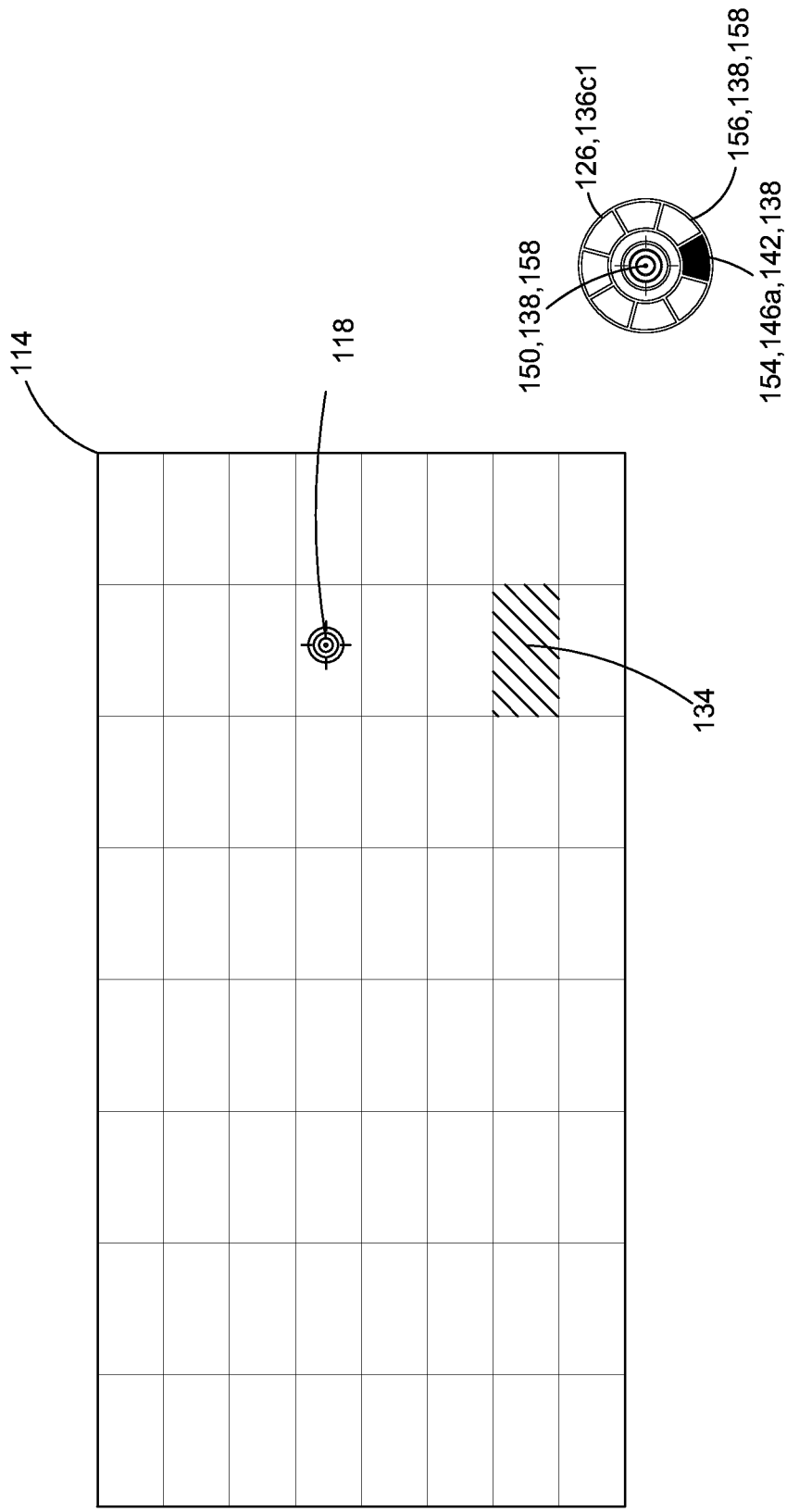
FIG. 14 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 will procced to block 510 and then to block 520. FIG. 14 illustrates the results of block 510 and block 520. As can be seen, the current location 134 is now under the target location 118 and the symbol 126 is shown in the directional state 136c of far low 136c1, namely with the section area 154 of the lowest section 146a illuminated in the first color 142 (red). The outline 156 and the target icon 150 are each illuminated in the third color 158 (white). The method 500 proceeds to block 530.

Figure 15:
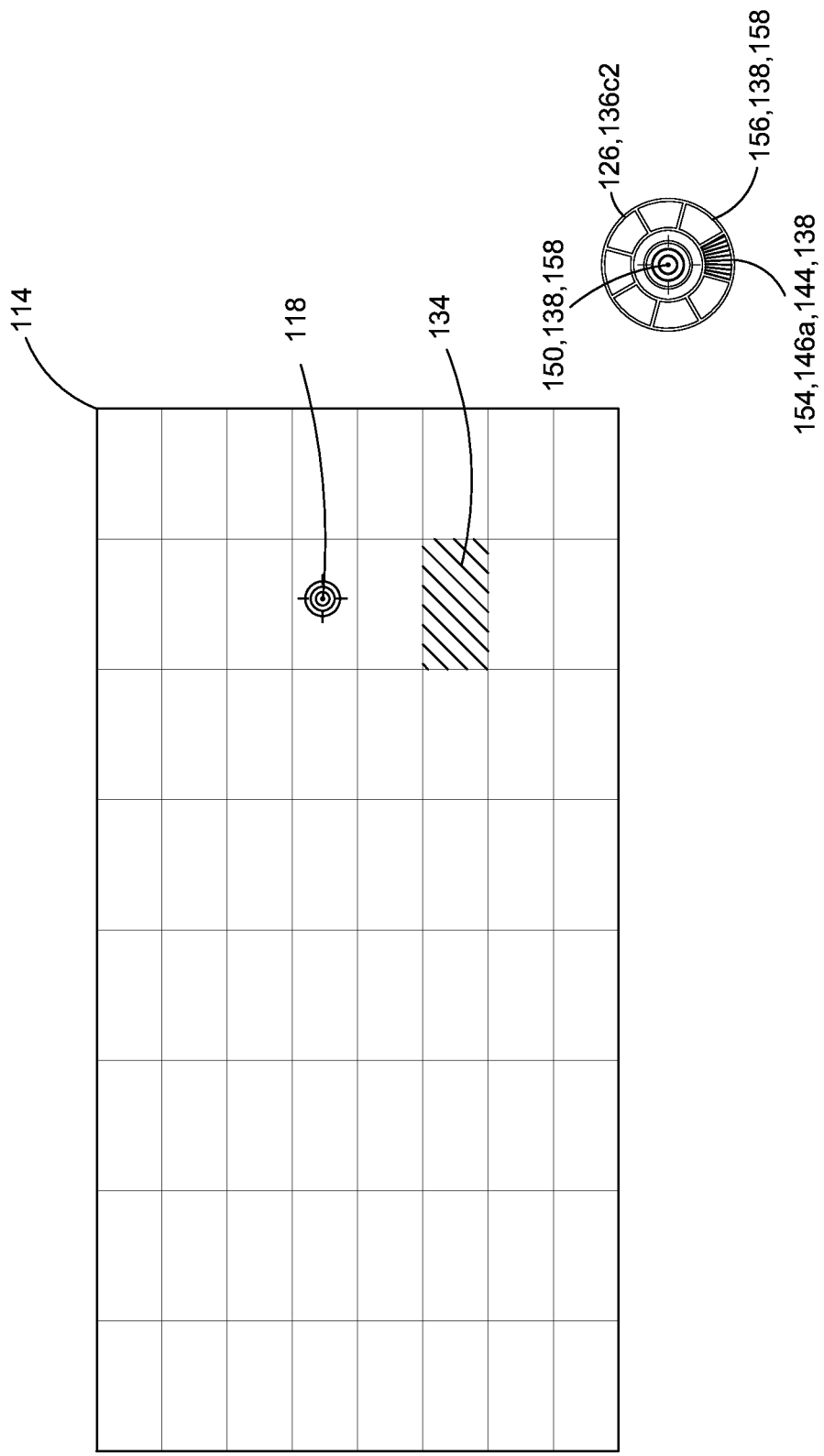
FIG. 15 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 proceeds to block 510 and then block 520. FIG. 15 illustrates the results of block 510 and block 520. As can be seen, the current location 134 is now closer to the target location 118. The resulting symbol 126 is displayed in the directional state 136c of slightly low 136c2 represented by the section area 154 of the lowest section 146a illuminated in the second color 144 (yellow). The outline 156 and the target icon 150 are each illuminated in the third color 158 (white). The method 500 proceeds to block 530.

Figure 16:
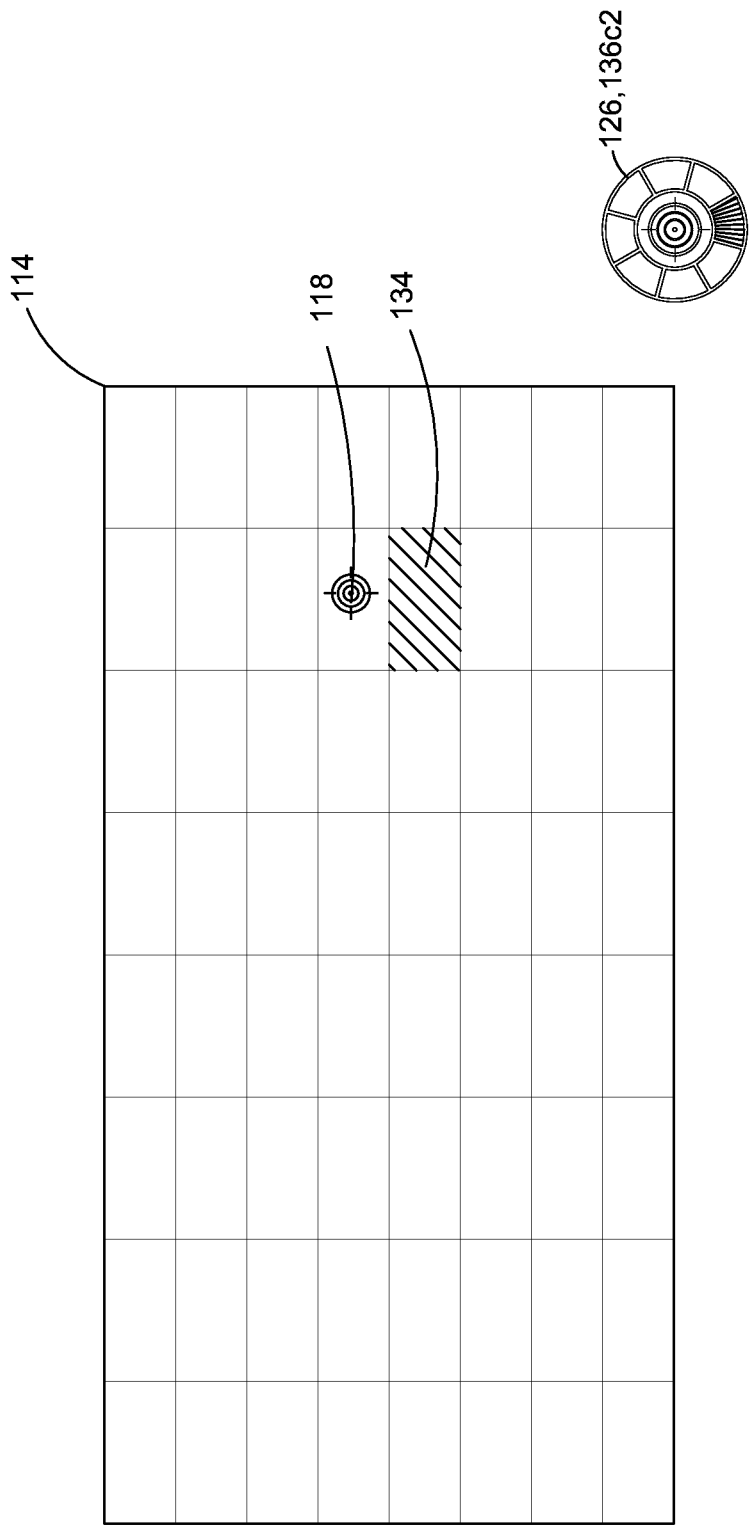
FIG. 16 is a schematic representation of an exemplary current location and an exemplary resulting symbol.

In block 530, the controller 124 determines whether the implement 110 has moved to a new current location 134a. In the exemplary scenario, the implement 110 has moved to a new current location 134a. As such, the method 500 proceeds to block 510 and then 520. FIG. 16 illustrates the results of block 510 and block 520. As can be seen, the current location 134 is closer to the target location 118 but the symbol 126 is unchanged because the current locations 134 of FIG. 15 and FIG. 16 are each in a range covered by the directional state 136c in which the symbol 126 is shown. The method 500 proceeds to block 530.

In block 530, the controller 124 determines whether the implement 110 has moved to a new current location 134a. In the exemplary scenario, the implement 110 has moved to a new current location 134a. As such, the method 500 proceeds to block 510 and then 520. FIG. 17 illustrates the results of block 510 and block 520. As can be seen, the current location 134 is on the target location 118. The resulting symbol 126 is displayed in the on-target state 136*a*, namely with the center area 140 illuminated in the fourth color 160 (green). The outline 156 is illuminated in the third color 158 (white). The implement 110, in this case a cutting tool 112, is now in the correct position to begin cutting the work surface 114.

In some embodiments, other graphical information (e.g., visual cues) may be used, such as shading, visual patterns, etc.

The features disclosed herein may be particularly beneficial for use with the machines 100 having an implement 110, such as machines 100 used in mining, earth moving, construction, material handling and the like in which a part of the machine 100 100 or the worksite obscures or partially obscures the target location 118 for placement of the implement 110 from the operator of the machine 100. The features disclosed herein allow an operator to guide an implement 110 to the target location 118 without the operator or others having to be in close proximity to the target location 118, thereby improving the safety of the operator/others.

What is claimed is:

1. A system for guiding an implement on a machine to a target location on a work surface, the system comprising:
    a graphical user interface (GUI); and
    a controller comprising at least one processor and at least one memory component in operable communication with the GUI, the controller configured to:
        (a) determine a current location of the implement relative to the target location on the work surface;
        (b) display on the GUI a symbol in one of a plurality of states, each state of the plurality of states associated with one or more locations of the implement relative to the target location, wherein the one of the plurality of states in which the symbol is displayed is indicative of the current location of the implement relative to the target location, each state of the plurality of states identified by variegating one portion of the symbol; and
        (c) repeat (a) and (b) each time the implement is moved to a new current location, wherein the symbol includes a plurality of portions each having a variegated condition and a non-variegated condition, the symbol including:
            a centroid portion associated with the target location,
            keystone portions arranged in an annular ring of keystones concentric about the centroid portion, each keystone portion indicates a relative direction of the current location of the implement from the target location,
            perimeter portions disposed within a space between each of the keystone portions and the centroid portion, each perimeter portion defining a periphery associated with one keystone portion; and
        wherein the plurality-of states includes an on-target state and a plurality of directional states,
            the on-target state having the centroid portion variegated with a target visual cue when the current location of the implement is less than a threshold distance from the target location, and
            each directional state having a single keystone portion variegated with a first visual cue when the current location of the implement is greater than the threshold distance from the target location indicating the relative direction from the target location.

2. The system of claim 1, wherein the GUI is disposed remotely from the machine.

3. The system of claim 1, wherein each state of the plurality of states is different from other states of the plurality of states.

4. The system of claim 1, wherein each directional state further indicates a proximity to the target location based on a first range of distances that are greater than a second range of distances, and the single keystone portion is variegated with the first visual cue when the current location is within the first range of distances from the target location and variegated with a second visual cue when the current location is within the second range of distances from the target location.

5. The system of claim 4, wherein the first visual cue is a first color and the second visual cue is a second color.

6. The system of claim 4, wherein the plurality of directional states include low, left, high and right.

7. The system of claim 6, wherein the plurality of directional states further include lower left, upper left, upper right and lower right.

8. The system of claim 1, wherein the symbol further includes a target icon portion within the centroid portion, wherein the target icon portion and the perimeter portions are variegated with a third visual cue while the centroid portion and the keystone portions are non-variegated when the current location of the implement is determined to be unknown.

9. A method of guiding an implement on a machine to a target location on a work surface, the method comprising:
    determining, by a controller, a current location of the implement relative to the target location;
    displaying on a graphical user interface (GUI) a symbol in one of a plurality of states, each state of the plurality of states associated with one or more locations of the implement relative to the target location, wherein the one of the plurality of states in which the symbol is displayed is indicative of the current location of the implement relative to the target location, each state of the plurality of states identified by variegating one portion of the symbol; and
    repeating the determining and the displaying each time the implement is moved to a new current location,
    wherein the symbol includes a plurality of portions each having a variegated condition and a non-variegated condition, the symbol including:
        a centroid portion associated with the target location,
        keystone portions arranged in an annular ring of keystones concentric about the centroid portion, each keystone portion indicates a relative direction of the current location of the implement from the target location,
        perimeter portions disposed within a space between each of the keystone portions and the centroid portion, each perimeter portion defining a periphery associated with one keystone portion and the centroid portion; and
    wherein the plurality of states includes an on-target state and a plurality of directional states,
        the on-target state having the centroid portion variegated with a target visual cue when the current location of the implement is less than a threshold distance from the target location, and
        each directional state having a single keystone portion variegated with a first visual cue when the current location of the implement is greater than the threshold distance from the target location indicating the relative direction from the target location.

10. The method of claim 9, wherein each state of the plurality of states is different from other states of the plurality of states.

11. The method of claim 9, wherein each directional state further indicates a proximity of the current location to the target location based on a first range of distances that are greater than a second range of distances, and the single keystone portion is variegated with the first visual cue when the current location is within the first range of distances from the target location and variegated with a second visual cue when the current location is within the second range of distances from the target location.

12. The method of claim 9, wherein a position of the variegated single keystone portion in relation to the centroid portion physically corresponds to a placement of the implement relative to the target location.

13. The method of claim 9, wherein the centroid portion includes a target icon portion, wherein the target icon portion and the perimeter portions are variegated with a third visual cue and the centroid portion and the keystone portions are not variegated when the current location of the implement is determined to be unknown while the centroid portion and keystone portions remain non-variegated.

14. A system for guiding an implement on a machine to a target location on a work surface, the system comprising:
   a graphical user interface (GUI) disposed remotely from the machine; and
   a controller comprising at least one processor and at least one memory component in operable communication with the GUI, the controller configured to:
      (a) determine a current location of the implement relative to the target location on the work surface;
      (b) display on the GUI a symbol in one of a plurality of states, each state of the plurality of states associated with one or more locations of the implement relative to the target location, wherein the one of the plurality of states in which the symbol is displayed is indicative of the current location of the implement relative to the target location, each state of the plurality of states identified by variegating one portion of the symbol; and
      (c) repeat (a) and (b) each time the implement is moved to a new current location, wherein the symbol includes a plurality of portions each having a variegated condition and a non-variegated condition, the symbol including:
         a centroid portion associated with the target location,
         keystone portions arranged in an annular ring of keystones concentric about the centroid portion, each keystone portion indicates a relative direction of the current location of the implement from the target location,
         perimeter portions disposed within a space between each of the keystone portions and the centroid portion, each perimeter portion defining a periphery associated with one keystone portion; and
      wherein the plurality of states includes an on-target state and a plurality of directional states,
         the on-target state having the centroid portion variegated with a target color when the current location of the implement is less than a threshold distance from the target location, and
         each directional state having a single keystone portion variegated with a first color when the current location of the implement is greater than the threshold distance from the target location indicating the relative direction from the target location.

15. The system of claim 14, wherein each directional state further indicates a proximity to the target location based on a first range of distances that are greater than a second range of distances, and the single keystone portion is variegated with the first color when the current location is within the first range of distances from the target location and with a second color when the current location is within the second range of distances from the target location.

16. The system of claim 15, wherein the plurality of directional states includes low, lower left, left, upper left, high, upper right, right, and lower right.

17. The system of claim 14, wherein the symbol further includes a target icon portion within the centroid portion, wherein the target icon portion and the perimeter portions are variegated with a third color and while the centroid portion and the keystone portions are non-variegated when the current location of the implement is determined to be unknown.

* * * * *